June 24, 1924. 1,498,914
W. G. HOFFMAN
POTATO DIGGER CONVEYER APRON
Filed April 12, 1923 2 Sheets-Sheet 1
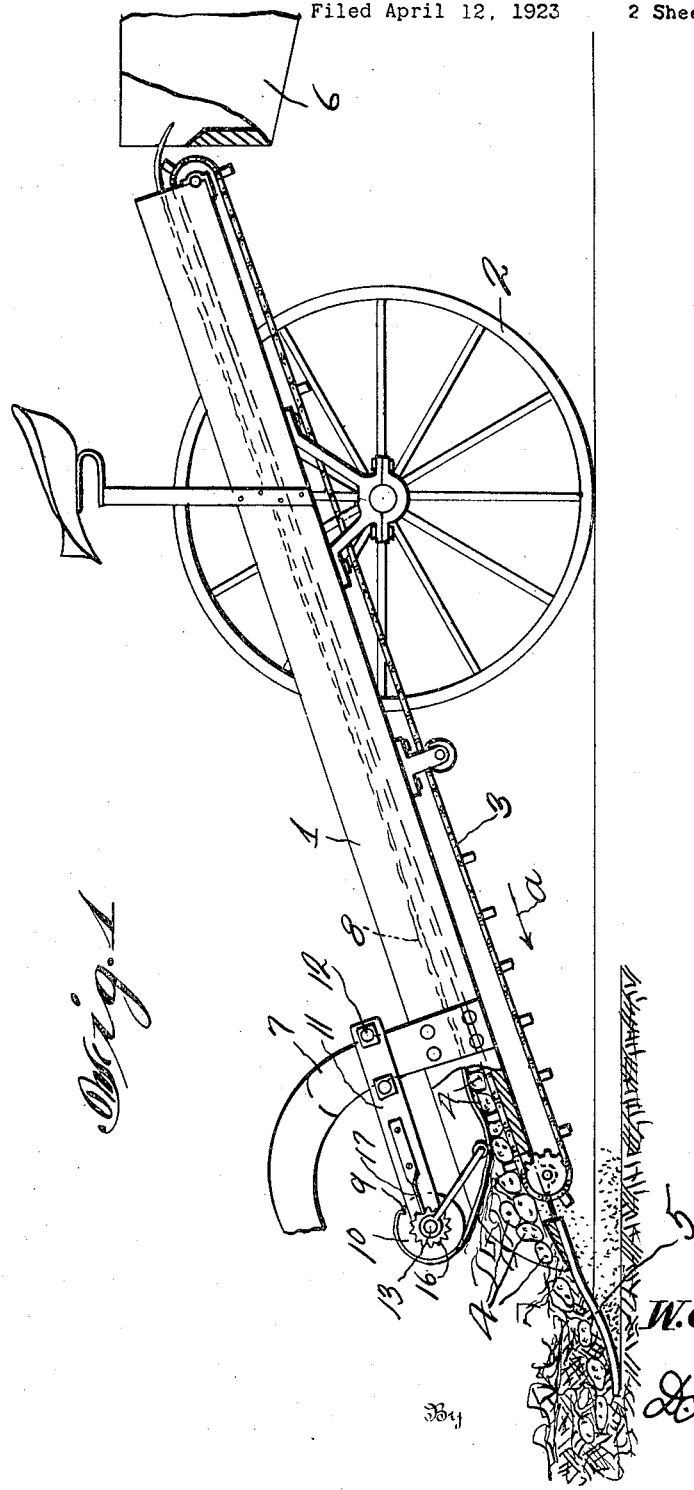
Inventor
W. G. Hoffman

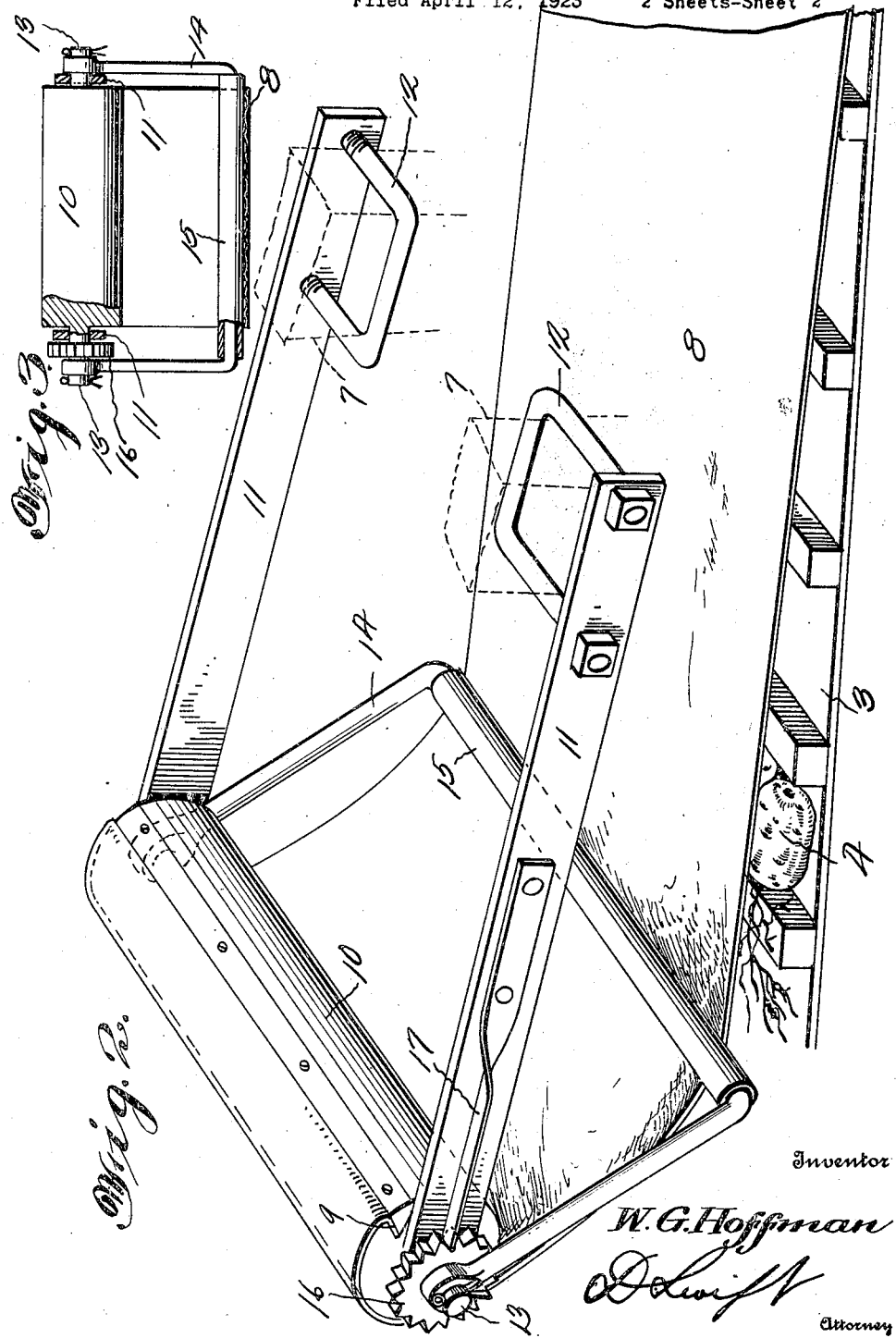

Patented June 24, 1924.

1,498,914

UNITED STATES PATENT OFFICE.

WILLIAM G. HOFFMAN, OF MARSLAND, NEBRASKA.

POTATO-DIGGER CONVEYER APRON.

Application filed April 12, 1923. Serial No. 631,633.

*To all whom it may concern:*

Be it known that I, WILLIAM G. HOFFMAN, a citizen of the United States, residing at Marsland, in the county of Dawes, State of Nebraska, have invented a new and useful Potato-Digger Conveyer Apron; and I do hereby declare the following to be a full, clear, and exact description of the invention, such as will enable others skilled in the art to which it appertains to make and use the same.

The invention relates to potato diggers and has for its object to provide in combination with the conveyer thereof an apron, which apron extends upwardly on the conveyer and forms means whereby when potatoes are conveyed upwardly on the conveyer, they are prevented from rolling down the conveyer and becoming bruised and damaged. The apron rests lightly on the potatoes, thereby holding them on the conveyer during the movement of the conveyer and at the same time preventing displacement of the potatoes downwardly during a potato conveying operation. The apron is preferably formed from canvas and is substantially the same width as the conveyer belt.

A further object is to provide a roller adjacent the forward end of the conveyer, but above the conveyer, to which roller one end of the apron is secured, and on which roller the apron may be wound when not in use, or for receiving a portion of the apron according to the length of apron desired and the length of the conveyer.

A further object is to provide a pivoted bail carried by the roller pintles and having its transverse portion weighted and adapted to engage the upper side of the apron adjacent the forward end of the conveyer and hold the apron at its forward end in engagement with the potatoes as they pass between the apron and the conveyer.

A further object is to provide detent means whereby the roller may be held in various positions against rotation, thereby preventing unwinding of the apron from the roller.

A further object is to support the roller by means of brackets detachably connected to the beams of the digger in such a manner that the device may be applied to a digger without varying the construction thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a conventional form of potato digger showing the device applied thereto.

Figure 2 is a perspective view of the forward end of the potato digger conveyer showing the apron carrying device.

Figure 3 is a rear view of the roller and pivoted apron holding bail, parts being broken away to better show the structure.

Referring to the drawing, the numeral 1 designates an inclined frame of the potato digger, and 2 the supporting wheels therefor. Disposed within the frame 1 is an endless conveyer 3, which conveyer moves in the direction of the arrow $a$ whereby the potatoes 4 when dug by the fingers 5 are elevated and discharged into a receptacle 6 in the rear of the machine. Secured to the opposite sides of the frame 1 are beams 7 which extend forwardly and to which draft animals may be attached in the usual manner. The potato digging machine is of conventional form, and the attachment hereinafter set forth may be applied to various kinds of machinery of the harvester type or digging type. It has been found that where potatoes are dug and elevated up an inclined conveyer, a great number of the potatoes roll down the conveyer and are bruised and damaged. To obviate this difficulty a canvas apron 8 is provided, which apron extends rearwardly over the conveyer 3 and preferably to the rear end of the conveyer, in such a manner whereby when the potatoes 4 are elevated the canvas 8 will engage the upper sides of the potatoes and prevent the potatoes from rolling down the conveyer. The lower end of the canvas 8 is secured at 9 to a transversely disposed roller 10, and on which roller, the canvas not in use may be rolled, or when the machine is not in use the entire length of canvas may be wound on the roller 10 for storage purposes. Roller 10 is disposed above the forward end of the conveyer 3 and is supported by forwardly extending bars 11, which bars are detachably secured to the beams 7 by means of U-bolts 12. The pintles 13 of the roller 10 are rotatably mounted in bearings of the bars 11, therefore the bars support the roller. Pivotally mounted on the pintles 13 is a U-shaped bail 14, the transverse portion of which is provided with a weight 15 adapted to rest on the upper side of the apron 8 and hold the same down adjacent the forward end thereof in engagement with the potatoes as they are forced on the conveyer 3 during the digging operation. As the potatoes move rearwardly, it will be seen that they will be prevented from rolling down the inclined conveyer 3 by engagement of the apron 8 therewith. Carried by one of the pintles 13 is a ratchet wheel 16, with which ratchet wheel a spring detent 17 engages for holding the roller 10 against rotation under normal conditions, but allowing the apron 8 to be rolled on the roller 10, or to be unrolled therefrom by applying considerable power on the roller 10.

From the above it will be seen that an apron is provided in combination with a conveyer of a potato digging machine whereby potatoes will be prevented from rolling down the inclined conveyer and consequently the potatoes will not be bruised, cut or damaged in their passages over the conveyer.

The invention having been set forth what is claimed as new and useful is:—

The combination with the inclined conveyer of a digging machine for potatoes, of a flexible apron disposed above said conveyer and adapted to engage material thereon, brackets for supporting said apron, a roller carried by said brackets and to which the lower end of the apron is secured, a pivoted bail supported by the roller and brackets and engaging the apron adjacent its lower end for holding the apron in engagement with the material on the conveyer and a detent for holding the roller against rotation.

In testimony whereof I have signed my name to this specification in the presence of two subscribing witnesses.

WM. G. HOFFMAN.

Witnesses:
BURT FURMAN,
WINIFRED FURMAN.